US011010720B2

(12) United States Patent
Chakraborty et al.

(10) Patent No.: US 11,010,720 B2
(45) Date of Patent: May 18, 2021

(54) JOB POST SELECTION BASED ON PREDICTED PERFORMANCE

(71) Applicant: Microsoft Technology Licensing, LLC, Redmond, WA (US)

(72) Inventors: Tuhin Chakraborty, San Francisco, CA (US); Henry Kwan, San Francisco, CA (US); Chong Bu Won, San Francisco, CA (US); Aaron Tyler Rucker, San Francisco, CA (US); Pablo Crespo, San Francisco, CA (US); Rajan Ramesh Chaudhari, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 512 days.

(21) Appl. No.: 15/827,976

(22) Filed: Nov. 30, 2017

(65) Prior Publication Data

US 2019/0164133 A1    May 30, 2019

(51) Int. Cl.
*G06Q 10/10*      (2012.01)
*G06Q 50/00*      (2012.01)
*G06N 20/00*      (2019.01)

(52) U.S. Cl.
CPC ......... *G06Q 10/1053* (2013.01); *G06N 20/00* (2019.01); *G06Q 50/01* (2013.01)

(58) Field of Classification Search
CPC .. G06Q 10/1053; G06Q 10/105; G06Q 10/10; G06Q 10/00; G06Q 50/01; G06Q 50/00; G06N 20/00
See application file for complete search history.

(56) References Cited

U.S. PATENT DOCUMENTS

| | | | |
|---|---|---|---|
| 2005/0166157 A1* | 7/2005 | Ollis | G06F 3/0482 715/764 |
| 2011/0099119 A1* | 4/2011 | Kwiat | G06Q 10/1053 705/321 |
| 2014/0244532 A1* | 8/2014 | Budzienski | G06Q 10/1053 705/321 |
| 2015/0006414 A1* | 1/2015 | Janapareddy | G06Q 10/1053 705/319 |
| 2015/0193685 A1* | 7/2015 | Srinivasan | H04N 21/25 706/11 |
| 2017/0154313 A1* | 6/2017 | Duerr | G06F 16/248 |
| 2018/0189739 A1* | 7/2018 | Kenthapadi | G06Q 50/01 |
| 2018/0322199 A1* | 11/2018 | Fernandes | G06Q 10/105 |

* cited by examiner

*Primary Examiner* — Namrata Boveja
*Assistant Examiner* — Divesh Patel
(74) *Attorney, Agent, or Firm* — Schwegman Lundberg & Woessner, P.A.

(57) ABSTRACT

Methods, systems, and computer programs are presented for managing company job listings in a social network by selecting which job posts are included in the company job slots. One method includes an operation for selecting a job post, from a company job pool, for inclusion in the job slots that are presented to members. Further, the method includes operations for presenting the selected job post to members, and for determining a view threshold number based on the day of a week that the job post was posted. The number of views within a period is determined, and when the number is greater than or equal to the view threshold number, the job post is kept in the job slot; otherwise, the job post is marked as a rotatable job post, where rotatable job posts are discarded from the job slots when other jobs are available in the job pool.

19 Claims, 11 Drawing Sheets

| DAY | THRESHOLD (T)VIEWS NEXT DAY | TOTAL JOBS | SUCCESS JOBS | SUCCESS JOBS > T | % SUCCESS JOBS > T | % JOBS TO ROTATE |
|---|---|---|---|---|---|---|
| SUNDAY | 7 | 2673 | 1075 | 1067 | 99.26% | 23.16% |
| SUNDAY | (8) | 2673 | 1075 | 1065 | 99.07% | 26.15% |
| SUNDAY | 9 | 2673 | 1075 | 1057 | 98.33% | 29.33% |
| FRIDAY | 2 | 6855 | 2524 | 2510 | 99.45% | 15.90% |
| FRIDAY | (3) | 6855 | 2524 | 2480 | 98.26% | 27.12% |
| FRIDAY | 4 | 6855 | 2524 | 2428 | 96.20% | 36.26% |

JOB POST SELECTION BASED ON PREDICTED PERFORMANCE

TECHNICAL FIELD

The subject matter disclosed herein generally relates to methods, systems, and programs for filtering and prioritizing available job posts.

BACKGROUND

Large companies may have thousands of jobs open at any time. These companies often utilize service providers to increase the visibility of their job openings to potential candidates, and these service providers may include a professional network focused on professional connections.

A large company may purchase a large number of job slots from the professional network, which are filled with job openings selected by the company. The job openings in the job slots are then presented to the members of the professional network. However, managing the job slots is often complicated because hiring managers have to manually configure the job openings that they want to post in the available job slots. Further, there could be several managers, including human relationships managers, involved in determining how to use the job slots. The result is that many times, available job slots are not utilized even though there may be job listings that the company would like to present to members.

Further, sometimes job slots may be filled by jobs that are not performing well or that already have enough applicants to find an appropriate hire. These jobs take valuable space in the professional network that could be used by other jobs that would perform well if posted.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
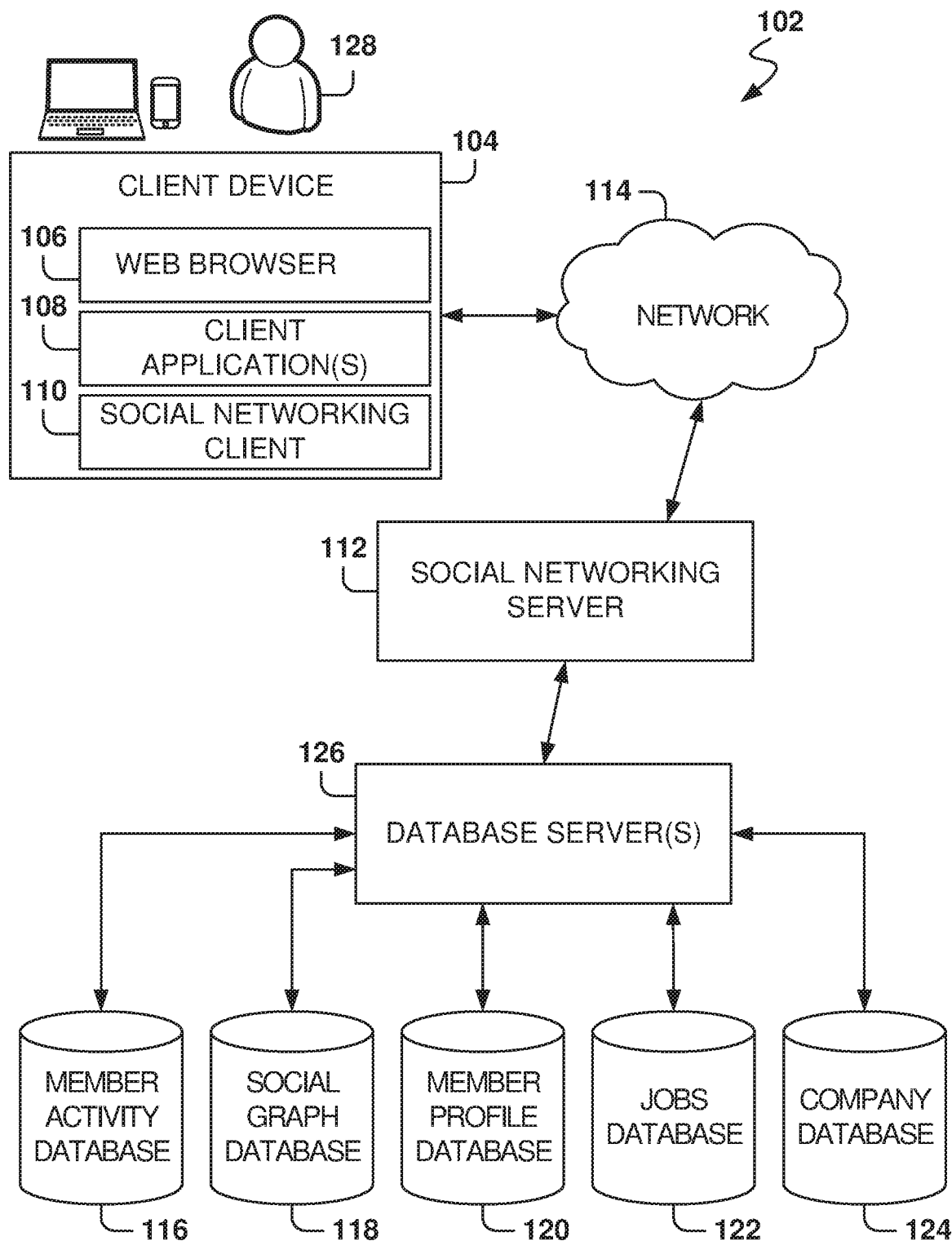
FIG. 1 is a block diagram illustrating a networked system, according to some example embodiments, including a social networking server.

Example methods, systems, and computer programs are directed to managing company job listings in a social network by selecting which job posts are included in the company job slots. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Many companies that post jobs in the social network do not use all of their purchased job slots. In some cases, the social network retrieves job openings from the company's website in order to fill those job slots. Instead of just filling jobs at random, implementations try a job for a few days and check the performance of the job during that trial period. If the job does not perform, the job is rotated and another job is given a chance to utilize the job slot. In some implementations, the performance metric is the number of views of the job by members of the social network, but the threshold for determining good performance is dependent on the day of the week that the job is posted, as some days of the week tend to have more views than other days of the week.

Implementations solve the problem, among others, related to maximizing the utility of jobs extracted from a company's website. Since the extracted jobs do not include specific instructions for handling, implementations analyze the jobs in order to predict their expected performance with regards to the ability to hire an employee to fill the job. Based on their expected performance during a short trial period, the jobs are prioritized for inclusion in the available job slots, such that the best performing jobs are presented to users while poor-performing jobs are presented only if empty slots are available and not used by jobs with better expected performance. This maximizes the value provided by the use of the job slots purchased by the company.

An analysis is performed regarding the relative performance of job posts based on the day of the week the job posts are posted, and the analysis determines what should be the threshold number of views for the job post based on the day of the week the job was posted. The threshold number of views is used to determine which jobs remain filling the job slots and which jobs are rotatable, e.g., replaceable by better job posts when available.

Further, if the job post is performing well, the job keeps filling the job slot, but only during a predetermined number of days, which is enough to get an adequate number of good job applications. Since the job is likely to be filled with the number of applications received, continuing to keep the job in the job slot would not be beneficial to the job poster.

In some implementations, the job post is analyzed before being posted in order to predict the performance of the job if placed in the job slot. Those jobs that are expected to perform well are then selected for filling job slots ahead of other jobs that will not likely perform well. In some implementations, a machine-learning algorithm is utilized for determining a score indicative of the predicted performance for the job post.

In one embodiment, a method is provided. The method includes an operation for selecting a job post, from a job pool of job posts from a company, for inclusion in one of a plurality of job slots. The job posts included in the job slots are presented to members of a social network. The method further includes operations for presenting the selected job post to one or more members of the social network, and for determining a view threshold number for the selected job post, the view threshold number being based on a day of a week that the selected job post was posted. Additionally, the number of views of the selected job post by members of the social network within a predetermined time period is determined, and when the number of views is greater than or equal to the view threshold number, the selected job post is kept in the job slot. When the number of views is less than the view threshold number, the job post is replaced in the job slot with an additional job post from the job pool.

In another embodiment, a system includes a memory comprising instructions and one or more computer processors. The instructions, when executed by the one or more computer processors, cause the one or more computer processors to perform operations comprising: selecting a job post, from a job pool of job posts from a company, for inclusion in one of a plurality of job slots, the job posts included in the job slots presented to members of a social network; presenting the selected job post to one or more members of the social network; determining a view threshold number for the selected job post, the view threshold number being based on a day of a week that the selected job post was posted; determining a number of views of the selected job post by members of the social network within a predetermined time period; when the number of views is greater than or equal to the view threshold number, keeping the selected job post in the job slot; and when the number of views is less than the view threshold number, replacing the job post in the job slot with an additional job post from the job pool.

In yet another embodiment, a non-transitory machine-readable storage medium includes instructions that, when executed by a machine, cause the machine to perform operations comprising: selecting a job post, from a job pool of job posts from a company, for inclusion in one of a plurality of job slots, the job posts included in the job slots presented to members of a social network; presenting the selected job post to one or more members of the social network; determining a view threshold number for the selected job post, the view threshold number being based on a day of a week that the selected job post was posted; determining a number of views of the selected job post by members of the social network within a predetermined time period; when the number of views is greater than or equal to the view threshold number, keeping the selected job post in the job slot; and when the number of views is less than the view threshold number, replacing the job post in the job slot with an additional job post from the job pool.

FIG. 1 is a block diagram illustrating a networked system, according to some example embodiments, including a social networking server 112, illustrating an example embodiment of a high-level client-server-based network architecture 102. The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a smart phone, a tablet, a multi-processor system, a microprocessor-based or programmable consumer electronic system, or any other communication device that a member 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more members 128 may be a person, a machine, or other means of interacting with the client device 104. In various embodiments, the member 128 is not part of the network architecture 102, but may interact with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a member 128, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-124. In one example embodiment, the social networking server 112 is communicatively coupled to a member activity database 116, a social graph database 118, a member profile database 120, a jobs database 122, and a company database 124. The databases 116-124 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a member initially registers to become a member of the social networking service provided by the social networking server 112, the member is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as "industry"), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120. In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiments, the company database 124 stores information regarding companies in the member's profile. A company may also be a member, but some companies may not be members of the social network although some of the employees of the company may be members of the social network. The company database 124 includes company information, such as name, industry, contact information, website, address, location, geographic scope, and the like.

As members interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 112), updating a current status, posting content for other members to view and comment on, posting job suggestions for the members, searching job posts, and other such interactions. In one embodiment, records of these interactions are stored in the member activity database 116, which associates interactions made by a member with his or her member profile stored in the member profile database 120. In one example embodiment, the member activity database 116 includes the posts created by the members of the social networking service for presentation on member feeds.

The jobs database 122 includes job postings offered by companies in the company database 124. Each job posting includes job-related information such as any combination of employer, job title, job description, requirements for the job, salary and benefits, geographic location, one or more job skills required, day the job was posted, relocation benefits, and the like.

In one embodiment, the social networking server 112 communicates with the various databases 116-124 through the one or more database server(s) 126. In this regard, the database server(s) 126 provide one or more interfaces and/or services for providing content to, modifying content in, removing content from, or otherwise interacting with the databases 116-124. For example, and without limitation, such interfaces and/or services may include one or more Application Programming Interfaces (APIs), one or more services provided via a Service-Oriented Architecture (SOA), one or more services provided via a Representational State Transfer (REST)-Oriented Architecture (ROA), or combinations thereof. In an alternative embodiment, the social networking server 112 communicates with the databases 116-124 and includes a database client, engine, and/or module, for providing data to, modifying data stored within, and/or retrieving data from the one or more databases 116-124.

While the database server(s) 126 is illustrated as a single block, one of ordinary skill in the art will recognize that the database server(s) 126 may include one or more such servers. For example, the database server(s) 126 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 116-124, or combinations thereof. Accordingly, and in one embodiment, the database server(s) 126 implemented by the social networking service are further configured to communicate with the social networking server 112.

Figure 2:
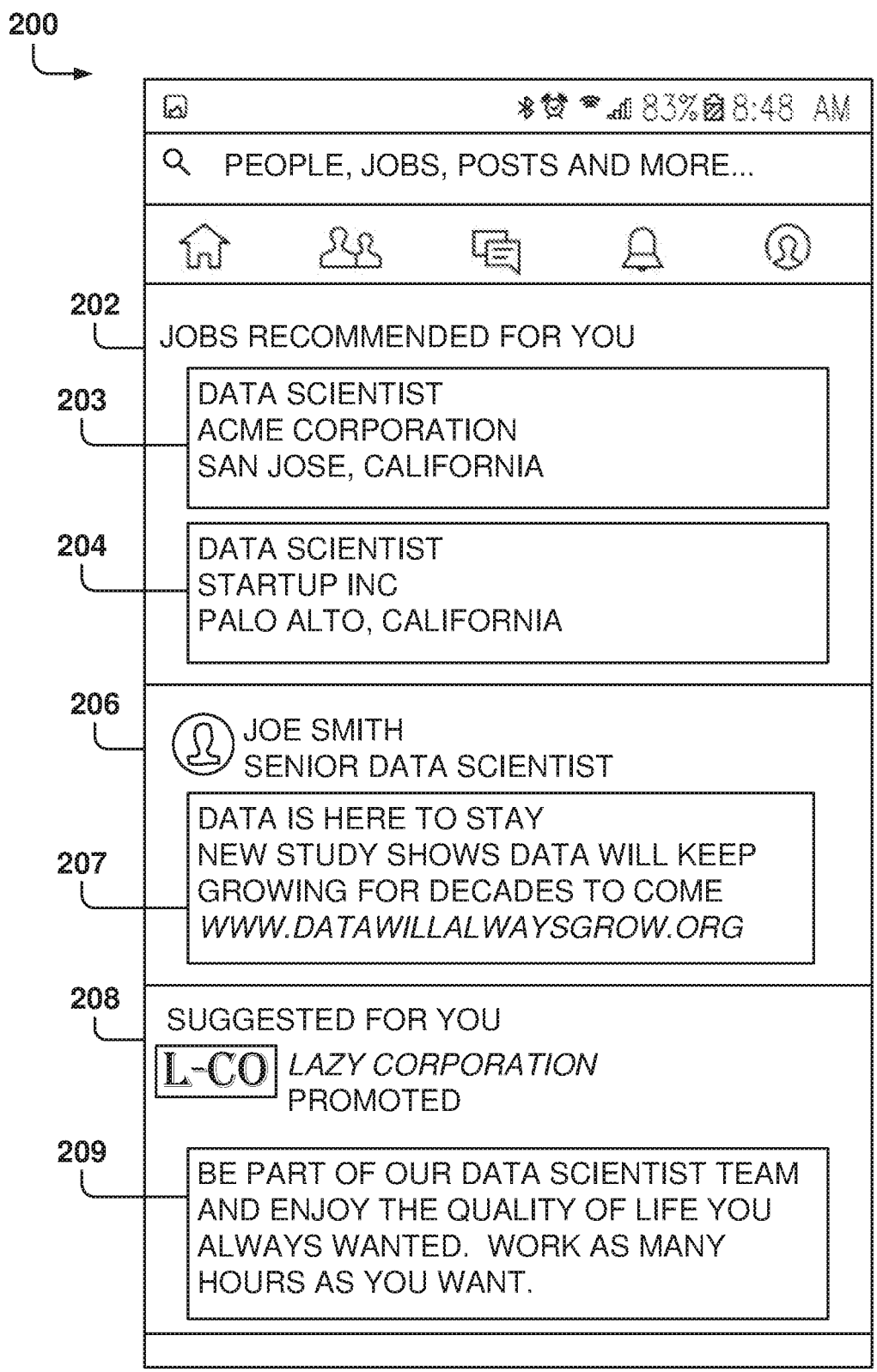
FIG. 2 is a screenshot of a user feed that includes items in different categories, according to some example embodiments.

FIG. 2 is a screenshot of a member feed 200 that includes items in different categories, according to some example embodiments. In the example embodiment of FIG. 2, the member feed 200 includes different categories, such as job recommendations 202, member posts 206, and sponsored items 208, and other embodiments may include additional categories.

In one example embodiment, the social network user interface provides the job recommendations 202 (e.g., job posts 203 and 204) that match the job interests of the member and that are presented with a specific job search request from the member.

The user posts category 206 include items 207 posted by members of the social network (e.g., items posted by connections of the member 128), and may be comments made on the social network, pointers to interesting articles or webpages, etc.

The sponsored items category 208 includes items 209 placed by sponsors of the social network which pay a fee for posting those items 209 on member feeds, and may include advertisements or links to webpages that the sponsors want to promote.

Although the categories are shown as separated within the member feed 200, the items from the different categories may be intermixed, and not just be presented as a block. Thus, the member feed 200 may include a large number of items from each of the categories, and the social network decides the order in which these items are presented to the member based on the desired goals.

Figure 3:
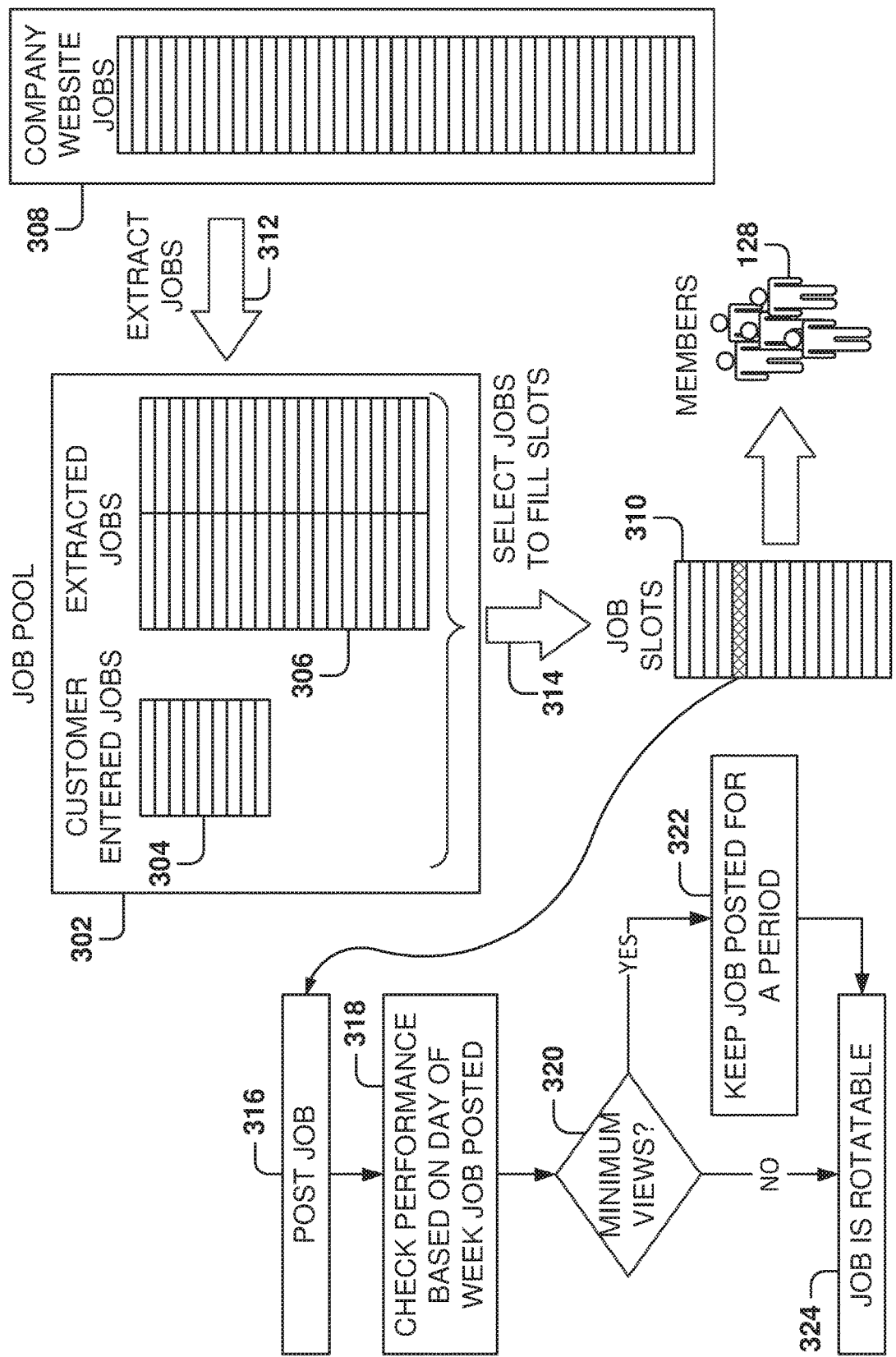
FIG. 3 illustrates the filling of job slots owned by a company, according to some example embodiments.

FIG. 3 illustrates the filling of job slots owned by a company, according to some example embodiments. A job post is a message indicating a job opening for a company, where the job opening is for employment at the company. A job slot 310, as used herein, is a reservation made by a company to present a job post in the social network. The job slots may be filled by the company (or by the social network) with job posts.

A job pool 302 is a set of job posts that are candidates for being included 314 as a job slot 310 for presentation to members 128 of the social network. In some example embodiments, the job pool 302 may include customer-entered jobs 304, which are entered by the company in the social network, and also extracted jobs 306, which are job posts extracted 312 from a company website, also referred to as company website jobs 308. The extraction 312 may be performed automatically by the social network without requiring that the company actively transfers those job posts to the social network. In some example embodiments, an interface may be provided by the social network in order to allow the company to determine how the jobs are to be extracted 312 from the company website and how the jobs slots may be filled.

In some example embodiments, the goal is to intelligently and automatically select job posts from the company to promote on the social network by filling the available job slots.

In some implementations, a job rotation logic for filling job slots treats all jobs equally, and does not take into account how well the jobs are performing. In some example embodiments, the performance may be measured by the number of views or by the number of applications, but other performance metrics may also be utilized, such as performance metrics based on a combination of number of views and number of applications, or number of confirmed hires.

This egalitarian policy results in some jobs receiving too many applications, while other jobs receive too few. Additionally, potentially successful jobs may be stuck in the backfill pool, waiting to be posted. Embodiments presented herein provide a more efficient process for posting jobs while improving results with the same amount of job slots.

In some example embodiments, the instructions by the company for filling job slots are utilized first to fill the job slots 310. If there are additional empty job slots, the social network may decide how to best utilize those available job slots.

For example, if the company has 1000 job slots, and the company specifies that the engineering jobs in San Francisco be given highest priority, those engineering jobs will be put into the available job slots 310. Assuming there are 500 engineering jobs in San Francisco, there is still another 500 job slots that may be utilized for other job posts.

In practice, companies often do not spend the time to configure these rules and end up filling job slots one at a time, leaving many job slots open, although the company website may include hundreds or thousands of available job postings. One approach would be to fill jobs randomly, which would reduce the number of empty job slots. However, random selection of job posts may result in inefficient use of the job posts, as there may be some job posts that are more important to the company than others, or that would benefit more from exposure to members of the social network.

In some example embodiments, the performance of the job post is monitored for a few days (referred to herein as the trial period), and a prediction is made on the performance of the job post based on the number of views or the number of job applications during this trial period. Based on the predicted performance, the job post is kept in the job slot, or the job post is considered rotatable. A job that is considered rotatable will be taken out of the job slot if there are other job posts that could take its place (e.g., job posts that are not considered rotatable), but if there are no other job posts available, or only rotatable job posts are available, then the job post may be kept in the job slot until a better job post is found. In other words, the rotatable job post is demoted within the ranking of job posts for filling the job slots 310. In some example embodiments, each rotatable job post receives a score based on predicted performance, and the score is used for ranking the rotatable job posts and selecting which will be included in a slot based on the ranking.

At operation 316, the job post is posted, and, at operation 318, the performance of the job post is checked to determine if the job post is performing adequately (e.g., at a minimum threshold level for the number of views) or not. In some example embodiments, the performance is based on the number of views of the job post by members, and in other example embodiments, the performance is based on the number of applications by members for the job. However, experience shows that the number of applications and the number of views are highly correlated, so the number of views is utilized as the metric because it is easier to calculate. Embodiments are presented with reference to the number of views, but other example embodiments may utilize other metrics, such as the number of applications, or a metric based on the number of views and the number of applications. More details are provided below with reference to FIG. 4 regarding the correlation between number of applications, the number of days the job is posted, and the probability of hiring a person to fill the job.

In some example embodiments, the threshold number of views for determining minimum performance is based on the day of the week that the job post is posted. Analysis of views of job posts by members of the social network shows that there is variance in the number of views based on the day of the week. More details are provided below with reference to FIG. 5 regarding the analysis for the number of views by day of the week.

Analysis has also shown that the performance of the job post within the first day, or few days, is a clear indicator of how the job post will perform in the long run. Therefore, a short trial period may be used to check the performance of the job post, and instead of wasting time keeping a job post that will not perform well in the long run, the nonperforming job post is discarded or demoted to make room for other job posts. In some example embodiments, the trial period is three days, but other embodiments may utilize trial periods in the range between 1 and 15 days, or in the range between 1 and 30 days.

At operation 320, a check is made to determine if the number of views meets (or exceeds) the minimum threshold, e.g., the number of views is greater than or equal to the view threshold determined based on the day of the week that the job was posted.

If the number of views meets the minimum threshold, the method flows to operation 322 where the job is kept for a predetermined number of presentation days. In some example embodiments, the predetermined number of presentation days for keeping the job post in the job slot is 25 days, but other example embodiments may utilize a different number of presentation days in the range from 10 days to 60 days.

If the number of views does not meet the minimum threshold (e.g., the number of views is less than the view threshold), the method flows to operation 324 where the job post is considered rotatable.

In some example embodiments, the job post may be taken off the job slots before the predetermined number of presentation days if the job has received a predetermined minimum amount of job applications. For example, the job may be taken down if the job post has received 100 or more applications. In other embodiments, the minimum number of job applications may be in the range from 25 to 200, but other values are also possible depending on the nature of the job (e.g., how big is the pool of possible candidates).

Some jobs may be very popular among job seekers, such as well-paid jobs in prestigious companies, so these jobs may receive a large number of applications in a few days. Once this threshold number of applications has been reached, the job may be taken down because hiring managers will probably stop looking at applications after 100 or 200, so getting additional applications may be a waste.

By taking down early the job posts that will not perform well, the company does not waste the job slot. Further, the company does not have to keep worrying about which jobs to select, since the system automatically selects the jobs that perform well. If job slots are also available for job posts that are not performing well, they are still posted.

The goal is to keep the job post rotating in the job slots in an effective and proactive manner. If the company has many job openings, but a lower number of job slots, the effective rotation distributes the job posts effectively among the limited number of job slots. Instead of having to wait 20 or 30 days to see if a job post is performing, valuable job slots are used better by taking down the jobs that are not performing well after three days.

One goal is to provide a way to allow job wrapping to prioritize (and de-prioritize) jobs to yield a large probability of a confirmed hire for a given job listing. For example, a company may have one job slot, which is filled by job A. When job B is added, job B is not posted because job A is using the slot. By rotating jobs, job B will take the job slot if job A is not performing or job A has been posted long enough such that there is a high likelihood that the job will be filled because the job has received enough number of views or enough number of applications. If the company manager forgets to rotate the jobs, job A may be posted for 60 days, where 30 of those days would be a waste because the probability of a confirmed hire would not go up.

In some example embodiments, the job post will also be removed from the job slot if the job post is no longer in the company's website. For example, if the job was extracted from that company's website, but the job is taken down, then the job is also taken down from the social network. Many jobs are posted for about two weeks, but other jobs may be harder to fill and may be posted for up to six months or longer.

Figure 4:
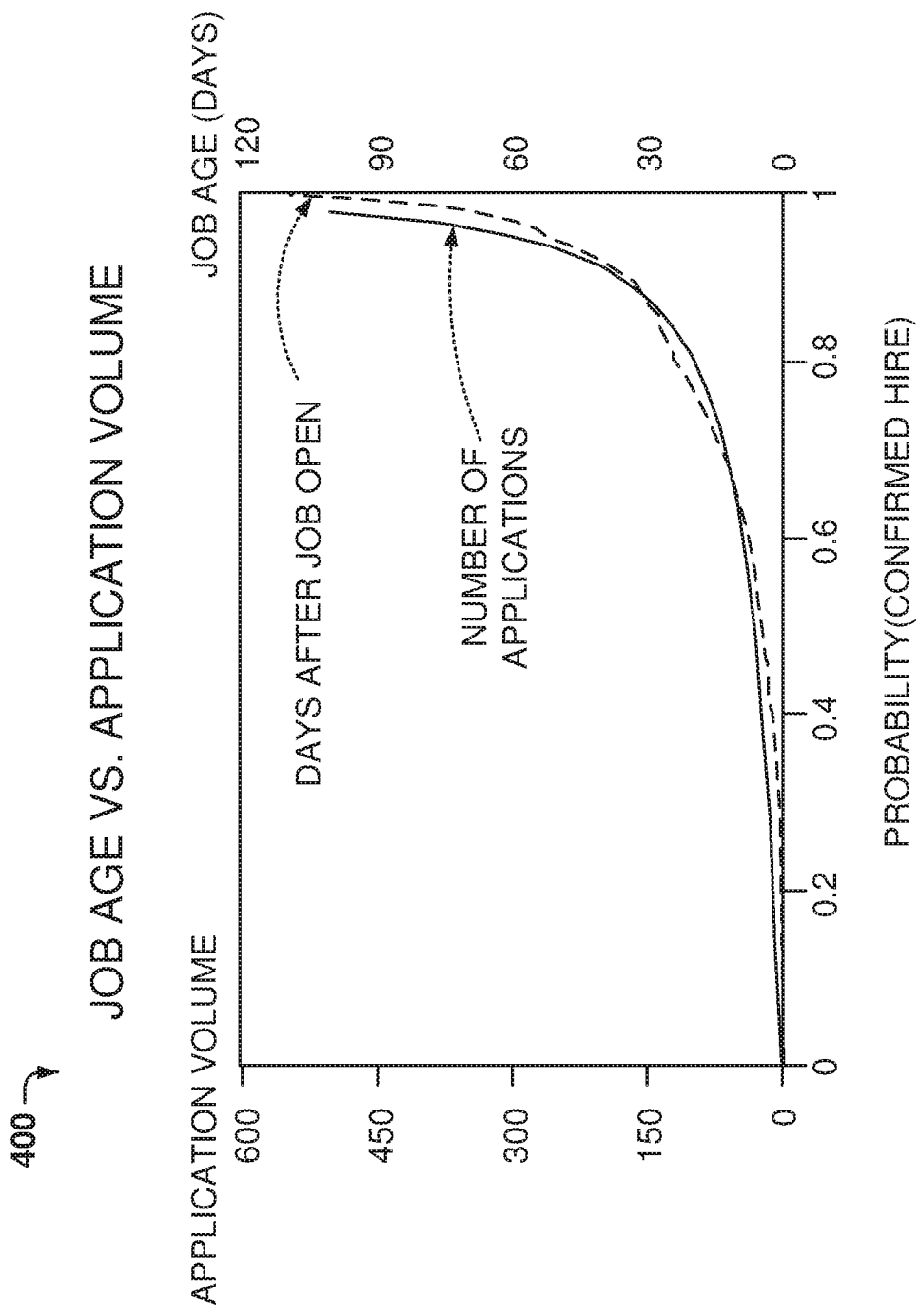
FIG. 4 is a chart showing the probability of a confirmed hire based on the number of applications and the age of the job, according to some example embodiments.

FIG. 4 is a chart showing the probability of a confirmed hire based on the number of applications and the age of the job, according to some example embodiments. An important metric for optimizing utilization of the job slots is to identify when a job post has had too many applications. By "too many" it is meant that, after receiving a certain threshold number of applications, the additional applications will not improve the probability of a hire.

It has been observed in some cases that, after around 30 days and at around 25 applications, the probability of a confirmed hire starts to taper off. At that point, the job is actually over-saturated and it is more beneficial for a company to put a new job into that job slot so the company may get more hires.

Chart 400 illustrates the probability of a confirmed hire based on the application volume (left vertical axis) and the job age in days (right vertical axis). The probability stops increasing rapidly around the 80% probability, which corresponds to about 25 days after the job is posted and around 100 applications for the job received.

This means that, approximately, having jobs posted for an additional 25 days increases by 10% the probability of a hire when compared to posting the job for 14 days. It also means that, after a certain point, the probability of a hire being made does not change very much whether there are 50, 100, or 200 applications. A recruiter will probably stop looking at resumes after viewing 25 to 50 resumes, so additional applications may be a waste.

The same analysis was performed for different industries, but the resulting curves suggest similar trends to the industry-agnostic curves of chart 400, although some slight variations may take place.

Over-performing jobs accumulate application volumes beyond what is needed to optimize confirmed-hire probabilities, while under-performing jobs may occupy a job slot without converting confirmed hires. Both instances are detrimental to a job system optimized for confirmed hire arrivals. Setting time-in-slot thresholds may mitigate both problems.

In some example embodiments, the probability signal, where the nominal return on confirmed hires drops tremendously, is identified. As mentioned previously, the probability curve begins to flatten around 80%, and this threshold would mean a job would be rotated when it either has received around 100 applications or has been open for around 25 days.

The probability of a confirmed hire goes up as the application volume increases. However, past the 80% probability, the rate of return greatly diminishes, as additional applications do not increase the probability much. This means that receiving a large number of additional applications does not improve significantly the probability of a confirmed hire.

Figure 5:
FIG. 5 is a table illustrating the selection of the view threshold based on the date of the week, according to some example embodiments.

FIG. 5 is a table 500 illustrating the selection of the view threshold based on the date of the week, according to some example embodiments. An analysis was performed to observe the relationship between successful jobs and number of views. A direct relationship was found between success rates and the day of the week that the job was posted.

Table 1 below shows statistics regarding the number of views on the day after a job is posted in the probability of the job post being successful. e.g., a successful hire. Table 500 in FIG. 5 illustrates some sections of Table 1.

TABLE 1

| Day of week job listed | T on next day | Succ. jobs above T | Jobs above T | Succ. jobs | Total jobs | Unsuc. jobs below T | Succ. jobs above T | % jobs to be rotated |
|---|---|---|---|---|---|---|---|---|
| Sun | 0 | 1075 | 2673 | 1075 | 2673 | 0.00% | 100.00% | 0.00% |
| Sun | 1 | 1075 | 2673 | 1075 | 2673 | 0.00% | 100.00% | 0.00% |
| Sun | 2 | 1075 | 2542 | 1075 | 2673 | 8.20% | 100.00% | 4.90% |
| Sun | 3 | 1075 | 2436 | 1075 | 2673 | 14.83% | 100.00% | 8.87% |
| Sun | 4 | 1074 | 2349 | 1075 | 2673 | 20.21% | 99.91% | 12.12% |
| Sun | 5 | 1073 | 2241 | 1075 | 2673 | 26.91% | 99.81% | 16.16% |
| Sun | 6 | 1071 | 2150 | 1075 | 2673 | 32.48% | 99.63% | 19.57% |
| Sun | 7 | 1067 | 2054 | 1075 | 2673 | 38.24% | 99.26% | 23.16% |
| Sun | 8 | 1065 | 1974 | 1075 | 2673 | 43.12% | 99.07% | 26.15% |
| Sun | 9 | 1057 | 1889 | 1075 | 2673 | 47.93% | 98.33% | 29.33% |
| Sun | 10 | 1047 | 1791 | 1075 | 2673 | 53.44% | 97.40% | 32.99% |
| Sun | 11 | 1037 | 1724 | 1075 | 2673 | 57.01% | 96.47% | 35.50% |
| Sun | 12 | 1032 | 1669 | 1075 | 2673 | 60.14% | 96.00% | 37.56% |
| Sun | 13 | 1019 | 1611 | 1075 | 2673 | 62.95% | 94.79% | 39.73% |
| Sun | 14 | 1011 | 1553 | 1075 | 2673 | 66.08% | 94.05% | 41.90% |
| Mon | 0 | 1902 | 4218 | 1902 | 4218 | 0.00% | 100.00% | 0.00% |

TABLE 1-continued

| Day of week job listed | T on next day | Succ. jobs above T | Jobs above T | Succ. jobs | Total jobs | Unsuc. jobs below T | Succ. jobs above T | % jobs to be rotated |
|---|---|---|---|---|---|---|---|---|
| Mon | 1 | 1902 | 4218 | 1902 | 4218 | 0.00% | 100.00% | 0.00% |
| Mon | 2 | 1901 | 3951 | 1902 | 4218 | 11.49% | 99.95% | 6.33% |
| Mon | 3 | 1901 | 3748 | 1902 | 4218 | 20.25% | 99.95% | 11.14% |
| Mon | 4 | 1896 | 3571 | 1902 | 4218 | 27.68% | 99.68% | 15.34% |
| Mon | 5 | 1890 | 3390 | 1902 | 4218 | 35.23% | 99.37% | 19.63% |
| Mon | 6 | 1884 | 3223 | 1902 | 4218 | 42.18% | 99.05% | 23.59% |
| Mon | 7 | 1872 | 3100 | 1902 | 4218 | 46.98% | 98.42% | 26.51% |
| Mon | 8 | 1862 | 2943 | 1902 | 4218 | 53.32% | 97.90% | 30.22% |
| Mon | 9 | 1845 | 2817 | 1902 | 4218 | 58.03% | 97.00% | 33.22% |
| Mon | 10 | 1833 | 2692 | 1902 | 4218 | 62.91% | 96.37% | 36.18% |
| Mon | 11 | 1803 | 2576 | 1902 | 4218 | 66.62% | 94.79% | 38.93% |
| Mon | 12 | 1778 | 2474 | 1902 | 4218 | 69.95% | 93.48% | 41.35% |
| Mon | 13 | 1753 | 2364 | 1902 | 4218 | 73.62% | 92.17% | 43.95% |
| Tue | 0 | 2702 | 7281 | 2702 | 7281 | 0.00% | 100.00% | 0.00% |
| Tue | 1 | 2702 | 7281 | 2702 | 7281 | 0.00% | 100.00% | 0.00% |
| Tue | 2 | 2702 | 6475 | 2702 | 7281 | 17.60% | 100.00% | 11.07% |
| Tue | 3 | 2701 | 5969 | 2702 | 7281 | 28.63% | 99.96% | 18.02% |
| Tue | 4 | 2699 | 5582 | 2702 | 7281 | 37.04% | 99.89% | 23.34% |
| Tue | 5 | 2691 | 5277 | 2702 | 7281 | 43.52% | 99.59% | 27.52% |
| Tue | 6 | 2677 | 4988 | 2702 | 7281 | 49.53% | 99.07% | 31.49% |
| Tue | 7 | 2666 | 4727 | 2702 | 7281 | 54.99% | 98.67% | 35.08% |
| Tue | 8 | 2646 | 4501 | 2702 | 7281 | 59.49% | 97.93% | 38.18% |
| Tue | 9 | 2613 | 4276 | 2702 | 7281 | 63.68% | 96.71% | 41.27% |
| Tue | 10 | 2581 | 4075 | 2702 | 7281 | 67.37% | 95.52% | 44.03% |
| Tue | 11 | 2547 | 3869 | 2702 | 7281 | 71.13% | 94.26% | 46.86% |
| Tue | 12 | 2497 | 3647 | 2702 | 7281 | 74.89% | 92.41% | 49.91% |
| Wed | 0 | 3455 | 9660 | 3455 | 9660 | 0.00% | 100.00% | 0.00% |
| Wed | 1 | 3455 | 9660 | 3455 | 9660 | 0.00% | 100.00% | 0.00% |
| Wed | 2 | 3452 | 8318 | 3455 | 9660 | 21.58% | 99.91% | 13.89% |
| Wed | 3 | 3447 | 7466 | 3455 | 9660 | 35.23% | 99.77% | 22.71% |
| Wed | 4 | 3438 | 6872 | 3455 | 9660 | 44.66% | 99.51% | 28.86% |
| Wed | 5 | 3413 | 6360 | 3455 | 9660 | 52.51% | 98.78% | 34.17% |
| Wed | 6 | 3374 | 5874 | 3455 | 9660 | 59.71% | 97.66% | 39.19% |
| Wed | 7 | 3335 | 5482 | 3455 | 9660 | 65.40% | 96.53% | 43.25% |
| Wed | 8 | 3286 | 5135 | 3455 | 9660 | 70.20% | 95.11% | 46.84% |
| Wed | 9 | 3213 | 4789 | 3455 | 9660 | 74.60% | 93.00% | 50.42% |
| Wed | 10 | 3142 | 4487 | 3455 | 9660 | 78.32% | 90.94% | 53.55% |
| Thu | 0 | 3409 | 8890 | 3409 | 8890 | 0.00% | 100.00% | 0.00% |
| Thu | 1 | 3409 | 8890 | 3409 | 8890 | 0.00% | 100.00% | 0.00% |
| Thu | 2 | 3395 | 7740 | 3409 | 8890 | 20.73% | 99.59% | 12.94% |
| Thu | 3 | 3379 | 6972 | 3409 | 8890 | 34.45% | 99.12% | 21.58% |
| Thu | 4 | 3341 | 6387 | 3409 | 8890 | 44.43% | 98.01% | 28.16% |
| Thu | 5 | 3304 | 5854 | 3409 | 8890 | 53.48% | 96.92% | 34.15% |
| Thu | 6 | 3252 | 5408 | 3409 | 8890 | 60.66% | 95.39% | 39.17% |
| Thu | 7 | 3186 | 5020 | 3409 | 8890 | 66.54% | 93.46% | 43.53% |
| Thu | 8 | 3121 | 4673 | 3409 | 8890 | 71.68% | 91.55% | 47.43% |
| Thu | 9 | 3040 | 4362 | 3409 | 8890 | 75.88% | 89.18% | 50.93% |
| Fri | 0 | 2524 | 6855 | 2524 | 6855 | 0.00% | 100.00% | 0.00% |
| Fri | 1 | 2524 | 6855 | 2524 | 6855 | 0.00% | 100.00% | 0.00% |
| Fri | 2 | 2510 | 5765 | 2524 | 6855 | 24.84% | 99.45% | 15.90% |
| Fri | 3 | 2480 | 4996 | 2524 | 6855 | 41.91% | 98.26% | 27.12% |
| Fri | 4 | 2428 | 4369 | 2524 | 6855 | 55.18% | 96.20% | 36.26% |
| Fri | 5 | 2358 | 3826 | 2524 | 6855 | 66.10% | 93.42% | 44.18% |
| Fri | 6 | 2263 | 3371 | 2524 | 6855 | 74.42% | 89.66% | 50.83% |
| Fri | 7 | 2148 | 2993 | 2524 | 6855 | 80.49% | 85.10% | 56.34% |
| Fri | 8 | 2054 | 2723 | 2524 | 6855 | 84.55% | 81.38% | 60.27% |
| Fri | 9 | 1947 | 2462 | 2524 | 6855 | 88.11% | 77.14% | 64.09% |
| Sat | 0 | 1873 | 4737 | 1873 | 4737 | 0.00% | 100.00% | 0.00% |
| Sat | 1 | 1873 | 4737 | 1873 | 4737 | 0.00% | 100.00% | 0.00% |
| Sat | 2 | 1861 | 4169 | 1873 | 4737 | 19.41% | 99.36% | 11.99% |
| Sat | 3 | 1853 | 3690 | 1873 | 4737 | 35.86% | 98.93% | 22.10% |
| Sat | 4 | 1831 | 3299 | 1873 | 4737 | 48.74% | 97.76% | 30.35% |
| Sat | 5 | 1798 | 2976 | 1873 | 4737 | 58.87% | 96.00% | 37.17% |
| Sat | 6 | 1740 | 2699 | 1873 | 4737 | 66.52% | 92.90% | 43.03% |
| Sat | 7 | 1687 | 2433 | 1873 | 4737 | 73.95% | 90.07% | 48.64% |
| Sat | 8 | 1626 | 2202 | 1873 | 4737 | 79.89% | 86.81% | 53.52% |
| Sat | 9 | 1543 | 2002 | 1873 | 4737 | 83.97% | 82.38% | 57.74% |

T = views threshold;
Succ. = Successful;
Unsuc. = Unsuccessful

The first column indicates the day of the week that the job was posted. The second column indicates a possible threshold T for the number of views on the next day. The next two columns indicate the number of successful jobs above the view threshold T and the total number of jobs (successful and unsuccessful) above the threshold T.

The next two columns indicate the number of successful jobs in the sample and the number of total jobs. The seventh column is a calculation of the percentage of unsuccessful jobs below the threshold T, which is equal to the number of unsuccessful jobs below the threshold T divided by the total number of unsuccessful jobs. The eighth column is the percentage of successful jobs above the threshold T, which is calculated as the number of successful jobs above the threshold T divided by the total number of successful jobs.

The last column includes the percentage of jobs that would be rotated if the threshold for the respective line was selected as the threshold 'T' for the number of views during the trial period, which is calculated as the number of jobs below the threshold divided by the total number of jobs.

It has been observed that there are differences in traffic depending on the day of the week. For example, weekend traffic tends to be lower than mid-week traffic. If someone posts a job on a Saturday or Sunday, just because the job does not perform as average does not mean the job will not be successful. This is why different thresholds are set depending on the day of the week that the job was posted.

For example, for a Sunday, about 54% of the jobs will be successful if the jobs get at least eight views. Selecting this threshold of eight views will eliminate some noisy job posts that do not get many views but occupy job slots. With this approach, the system takes down jobs that will not be successful, or that are very unlikely to be successful.

The same process is repeated for each day of the week. For example, the threshold for jobs posted on a Monday is six views, and the threshold for jobs posted on a Friday is three views. If a job gets 0 or 1 views on Tuesday for the job posted on Monday, this is a strong signal that this job will not perform well. However, if the job post gets six or more views, it is expected that the job will perform well and will stay in the job slot.

In some example embodiments, a successful job is defined as a job that gets 25 applications within a 30-day period. Thus, the analysis checks how successfully a job performed in the first few days after it was posted to estimate its future performance.

Thus, the jobs that were posted on Mondays were split between successful and non-successful jobs. It was then determined, based on the data in the table, that successful jobs tend to have at least eight views and the unsuccessful jobs tend to have fewer than eight views. Thus, this threshold is used for future jobs posted on a Monday to determine if it is predicted that the job will be successful or not.

Due to the positive correlation between views and applications, successful jobs tend to have more views. As a result, the view threshold is chosen to optimize for job rotation, such that a small percentage of successful jobs are deemed rotation eligible while a large percentage of unsuccessful jobs are also deemed rotation eligible. For example, for Sunday, a view threshold of eight implies that if jobs with fewer than eight views are considered rotation eligible, only about one percent of successful jobs will be eligible for rotation, while about 43% of unsuccessful jobs will be eligible for rotation.

In some example embodiments, the view threshold is selected such that about 99% of the successful jobs are above the view threshold in order to keep the successful jobs posted. Table 1 above shows the view thresholds selected in bold. Other embodiments may select different thresholds by adjusting the desired percentage of successful jobs to be included.

Table 1 describes how to select the view threshold based on the performance of the job the day after the job is posted. Therefore, if the job is not successful, the job is rotated two days after the job is posted. This means that unsuccessful jobs will stay posted up to three days.

In other example embodiments, the performance of the job may be tested over more than one day, e.g., two days, three days, or even a week. In this case, a similar table may be constructed taking into consideration the performance of previously posted jobs over several days, and still considering the day of the week that the job was posted. For example, if the job is to be tested for two days following the posting date, the table may be constructed to include the view threshold over two days based on the views in the two days following the posting date.

In some example embodiments, the threshold analysis illustrated in table 500 may be performed by job type or job title, thereby producing a more relevant threshold. For example, an engineering development job is typically a low volume job, while a customer service role tends to involve a higher volume of views.

However, the differences between job titles tend to be small, so the additional computational resources required for the by-job-type analysis may not be justified by the additional engineering and computational effort.

Figure 6:
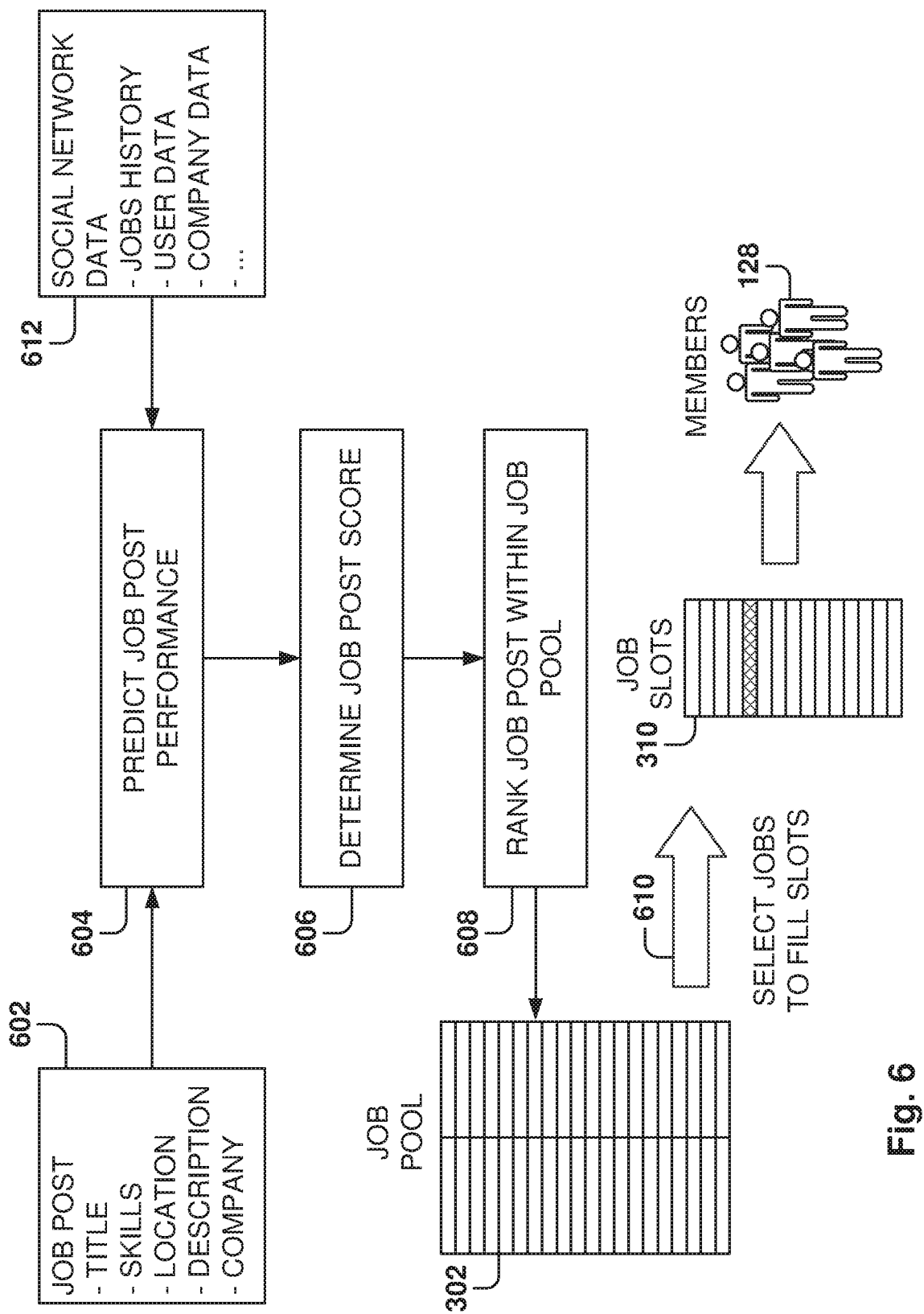
FIG. 6 illustrates the prediction of how well a job will perform and how to select jobs based on the predicted performance, according to some example embodiments.

FIG. 6 illustrates the prediction of how well a job will perform and how to select jobs based on the predicted performance, according to some example embodiments. In some example embodiments, the characteristics of the job post are considered to determine a score that predicts the performance of the job even before the job is posted. For example, by analyzing the job title, the skills required, and the description of the job, the score may be calculated. In some example embodiments, a machine-learning program is utilized to calculate the score, as described below with reference to FIG. 7. For example, software engineering positions in San Francisco tend to perform well; therefore, these jobs may be prioritized and tried ahead of other job posts.

As described above, embodiments reduce the amount of time wasted on nonperforming jobs by posting the jobs three days instead of 25 days. By discarding potentially nonperforming job posts, this time may be reduced further to zero days.

A job post 602 is received, where the job post 602 includes one or more of a title, skills desired, location, job description, and company name. At operation 604, the job post performance is predicted based on the job post information and social network data 612. The social network data 612 includes job-related information collected by the social network, such as job post history, member data (e.g., profile data and activity data), company data, etc.

From operation 604, the method flows to operation 606 where the job post score is determined, such as by using the machine-learning algorithm. At operation 608, the job post 602 is ranked within the job pool 302 that includes other job posts by the same company.

At operation 610, job posts are selected for inclusion in the job slots 310 that are presented to the members 128 of the social network. In some example embodiments, the job posts are selected according to their score, where job posts with higher scores are selected before job posts with lower scores.

In some example embodiments, job diversity is also considered when selecting the jobs for the job slots in order to increase the diversity of the job posts. For example, if there are 20 openings for software engineers and one opening for a salesperson, it may not be beneficial that all the job slots are taken by openings for software engineers while the salesperson job post gets no visibility. Therefore, in some example embodiments, diversity is considered together with the job post score to determine the selection for the job slots. For example, a candidate job post that already has similar job posts occupying job slots may have a reduction in score, at least for a period of time, to increase the diversity of other jobs that do not have similar job posts actually being presented.

Figure 7:
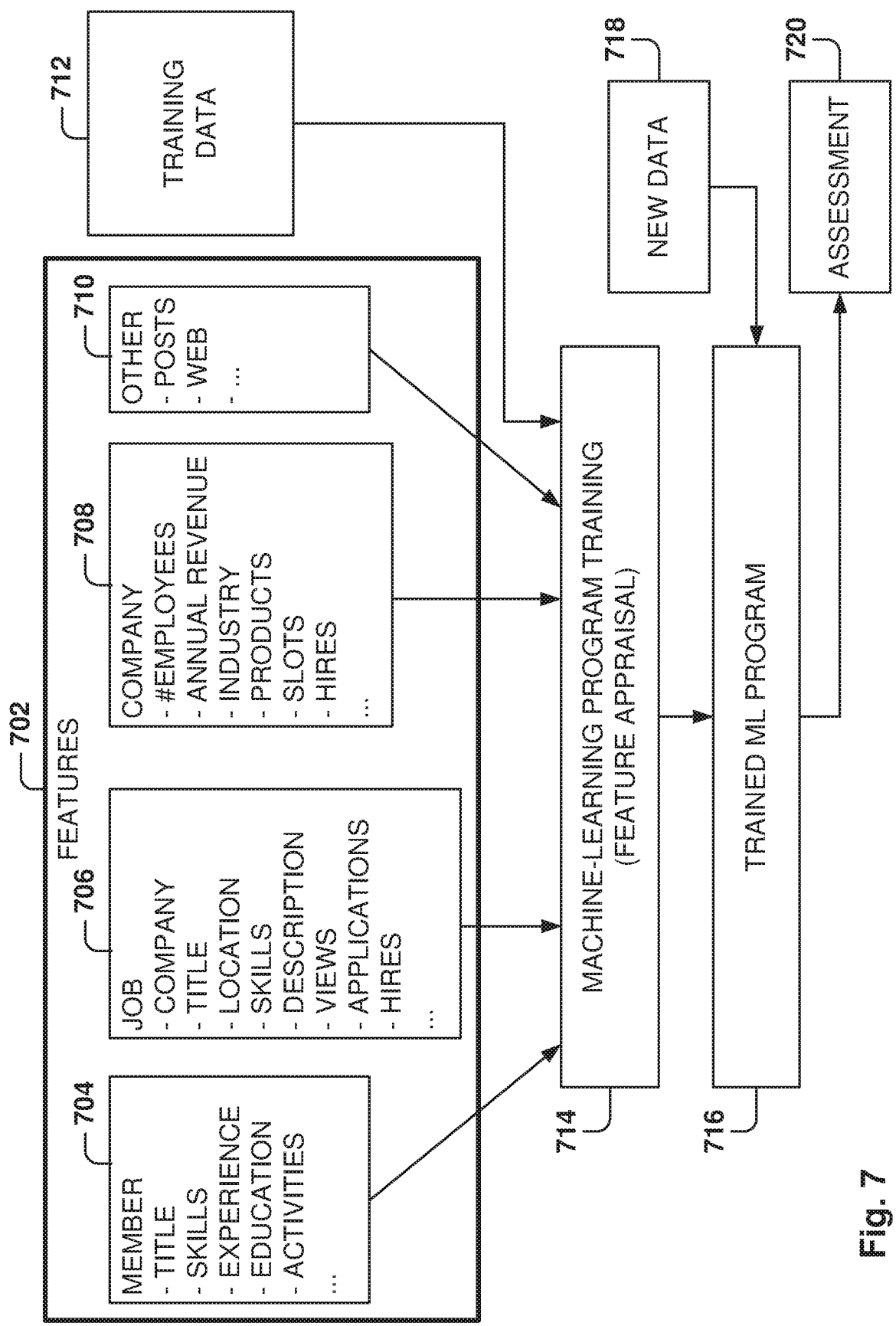
FIG. 7 illustrates the training and use of a machine-learning program, according to some example embodiments.

FIG. 7 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 712 to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example. Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a job post score (e.g., a number from 1 to 100) to reflect the predicted performance of the job post if the job post were presented to members of the social network. The machine-learning algorithms utilize the training data 712 to find correlations among identified features 702 that affect the outcome.

The machine-learning algorithms utilize features for analyzing the data to generate assessments 720. A feature 702 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 702 may be of different types and may include one or more of member features 704, job features 706, company features 708, and other features 710. The member features 704 may include one or more of the data in the member profile, such as title, skills, endorsements, experience, education, and the like.

The job features 706 may include any data related to the job, and the company features 708 may include any data related to the company. In some example embodiments, other features 710 may be included, such as post data, message data, web data, and the like.

The machine-learning algorithms utilize the training data 712 to find correlations among the identified features 702 that affect the outcome or assessment 720. In some example embodiments, the training data 712 includes known data for one or more identified features 702 and one or more outcomes, such as jobs searched by members, jobs viewed by members, applications received for the job, whether the job has a confirmed hire, and the like.

With the training data 712 and the identified features 702, the machine-learning tool is trained at operation 714. The machine-learning tool appraises the value of the features 702 as they correlate to the training data 712. The result of the training is the trained machine-learning program 716.

When the machine-learning program 716 is used to perform an assessment, new data 718 is provided as an input to the trained machine-learning program 716, and the machine-learning program 716 generates the assessment 720 as output. For example, when a new job post is received, the machine-learning program 716, trained with social network data, utilizes the member data and the job data to predict (e.g., provide a score) the performance of the job post if the job post is presented to the members of the social network.

In some example embodiments, an objective function is utilized that optimizes for the number of applications that the job post receives, and the goal is to optimize the objective function. The objective function may predict the number of applications (or views) that the job post will receive in a predetermined number of days.

In some example embodiments, the machine learning program does not take into consideration the company field, since the goal is to rank the jobs that are posted by the company. Therefore, during this ranking, all the job posts have the same company value.

In other example embodiments, the company is taken into consideration by the machine learning program 716, as the company value may affect the ranking. For example, engineering jobs may be ranked higher in a research company than in a restaurant.

In some example embodiments, the training data 712 includes the history of job posts presented in the social network over a period of time (e.g., two years or even longer periods of time). The history of a job post includes the job description, how many views the job obtained, how many applications were received, how long the job was posted, job location, etc.

Figure 8:
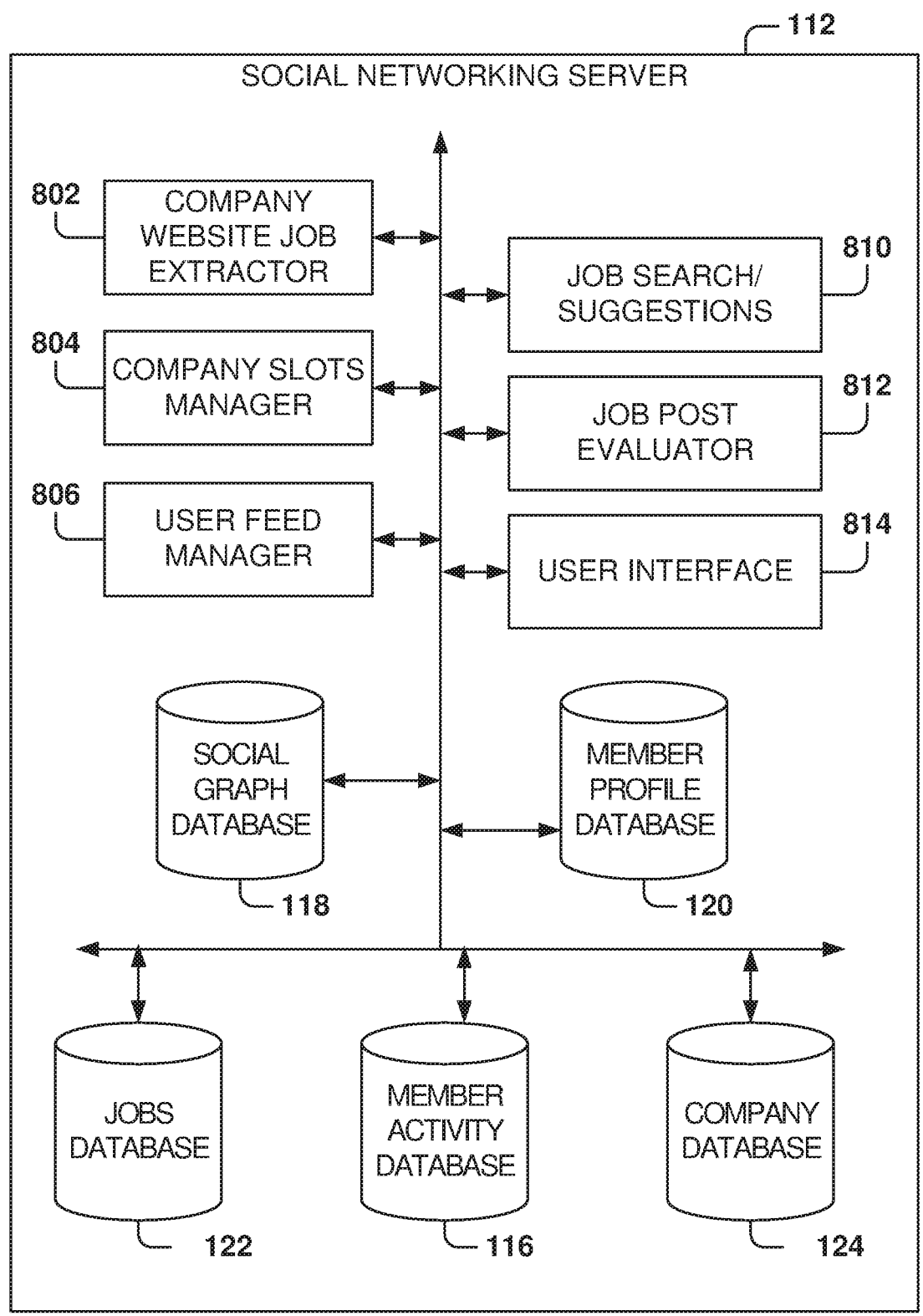
FIG. 8 illustrates a social networking server for implementing example embodiments.

FIG. 8 illustrates a social networking server 112 for implementing example embodiments. In one example embodiment, the social networking server 112 includes a company website job extractor 802, a company slots manager 804, a job search/suggestions server 810, a user feed manager 806, a job post evaluator 812, a user interface 814, and a plurality of databases, which include the social graph database 118, the member profile database 120, the jobs database 122, the member activity database 116, and the company database 124. In some example embodiments, the jobs database 122 is used to store analytical information regarding job post performance and other job-related data, such as number of daily views, job slots, job scores, jobs marked as rotatable, etc.

The company website job extractor 802 retrieves job openings from company websites. The job search/suggestions server 810 performs job searches based on a search query or based on a member profile in order to offer job suggestions. In some example embodiments, the job search/suggestions server 810 includes a machine-learning algorithm for performing the searches, which utilizes a plurality of features for selecting and scoring the jobs. The features include, at least, one or more of title, industry, skills, member profile, company profile, job title, job data, region, and salary range.

The company slots manager 804 analyzes job post performance (e.g., number of views of a number of applications) and job characteristics to determine the utilization of the company job slots. The user feed manager 806 assists in tracking the interaction of users with jobs. The job post evaluator 812 tracks the performance of job posts when presented to members of the social network, and, in some example embodiments, determines the scores associated with job post, as described above with reference to FIG. 7. The user interface 814 communicates with the client devices 104 to exchange user interface data for presenting the user interface 814 to the member.

It is to be noted that the embodiments illustrated in FIG. 8 are examples and do not describe every possible embodiment. Other embodiments may utilize different servers or additional servers, combine the functionality of two or more servers into a single server, utilize a distributed server pool, and so forth. The embodiments illustrated in FIG. 8 should therefore not be interpreted to be exclusive or limiting, but rather illustrative.

Figure 9:
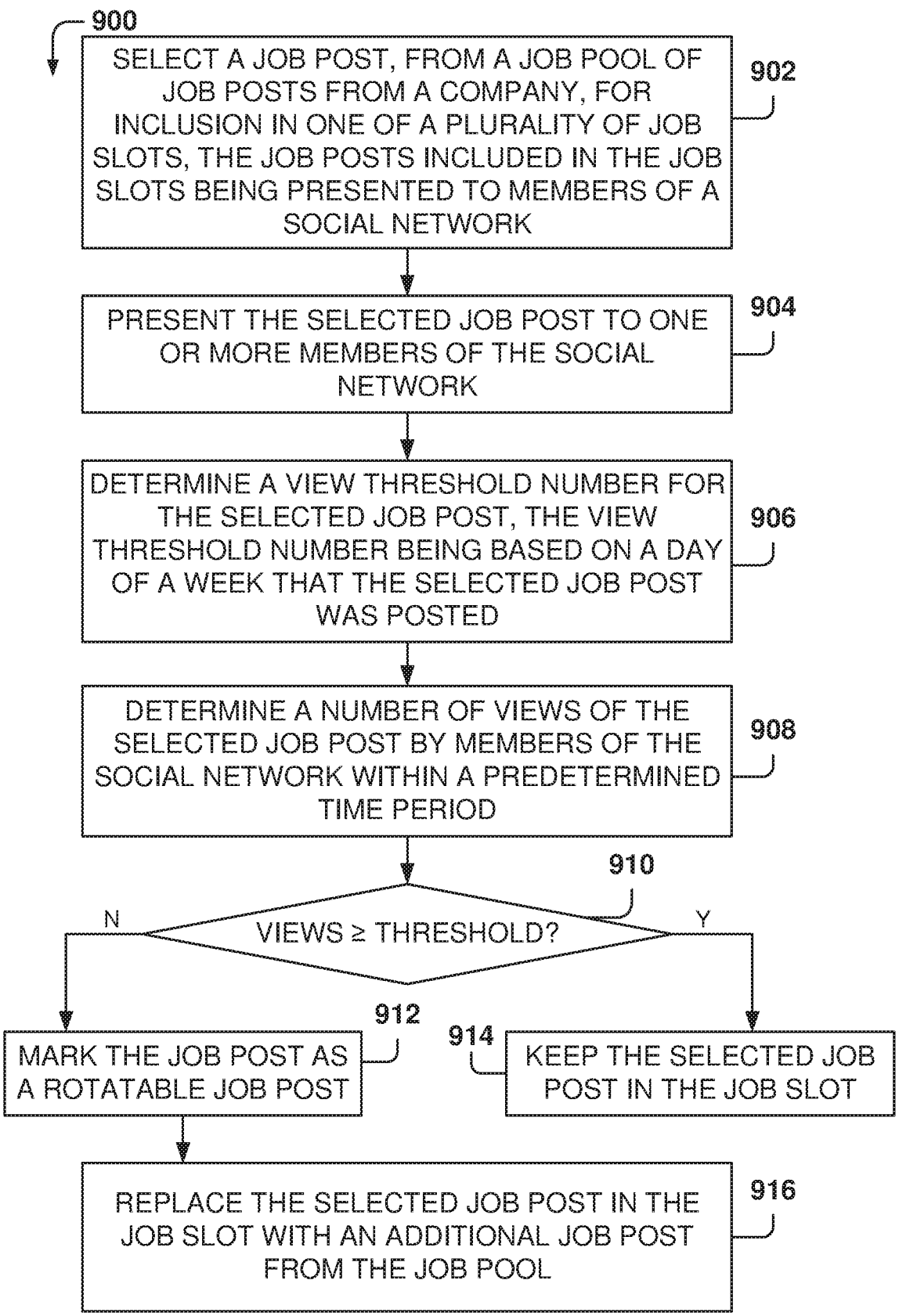
FIG. 9 is a flowchart of a method, according to some example embodiments, for managing company job listings in a social network by selecting which job posts are included in the company job slots.

FIG. 9 is a flowchart of a method 900, according to some example embodiments, for managing company job listings in a social network by selecting which job posts are included in the company job slots. While the various operations in this flowchart are presented and described sequentially, one of ordinary skill will appreciate that some or all of the operations may be executed in a different order, be combined or omitted, or be executed in parallel.

Typically, large companies do not have much insight into the characteristics of the active audience on the social network for their job posts, including a prediction of which jobs are going to perform the best. Embodiments presented herein assist hiring managers so processes are automated in order to better utilize the resources available in the social network, including the job slots purchased by the companies for presentation to the members of the social network. The process is automated and the company hiring managers do not have to take proactive actions, unless the hiring manager has special needs for some jobs.

At operation 902, a job post is selected, by one or more processors, from a job pool of job posts from a company for inclusion in one of a plurality of job slots. The job posts included in the job slots are presented to members of a social network.

From operation 902, the method 900 flows to operation 904 for presenting, by the one or more processors, the selected job post to one or more members of the social network. Operation 906 is for determining, by the one or more processors, a view threshold number for the selected job post, where the view threshold number is based on a day of a week that the selected job post was posted.

From operation 906, the method 900 flows to operation 908 for determining, by the one or more processors, a number of views of the selected job post by members of the social network within a predetermined time period.

At operation 910, a check is made to determine if the number of views is greater than or equal to the view threshold number. If the number of views is greater than or equal to the view threshold number, the method 900 flows to operation 914; otherwise, the method 900 flows to operation 912.

At operation 914, the one or more processors keep the selected job post in the job slot. Further, at operation 912, the one or more processors replace the selected job post in the job slot with an additional job post from the job pool.

In one example, replacing the selected job post in the job slot further comprises marking the job post as a rotatable job post, wherein rotatable job posts are discarded from the plurality of job slots when other jobs are available in the job pool of job posts.

In one example, determining the view threshold number for the selected job post further comprises accessing a performance history of successful and unsuccessful job posts in the social network, and determining the view threshold number based on a performance history for successful jobs based on a day of the week the successful jobs were posted.

In one example, the predetermined time period is a calendar day that follows a day when the selected job post was initially presented.

In one example, the predetermined time period is three calendar days that follow a day when the selected job post was initially presented.

In one example, selecting the job post further comprises selecting the job post from the job pool having a most recent creation time by the company.

In one example, selecting the job post further comprises utilizing a machine learning program for ranking job posts in the job pool, the machine learning program being trained with historical performance data of job posts, and selecting the job post based on the ranking.

In one example, selecting the job post further comprises selecting the job post based on a diversity of job posts in the job pool.

In one example, the method 900 further comprises importing jobs posted on a website of the company, and adding the imported jobs to the job pool.

In one example, a job post pinned to the job slot stays permanently in a corresponding job slot until the job post is unpinned.

In one example, the method 900 further comprises discarding the selected job post after the selected job post has been presented to the members of the social network for a predetermined number of days, the predetermined number of days being based on a probability that the job post results in a confirmed hire.

Figure 10:
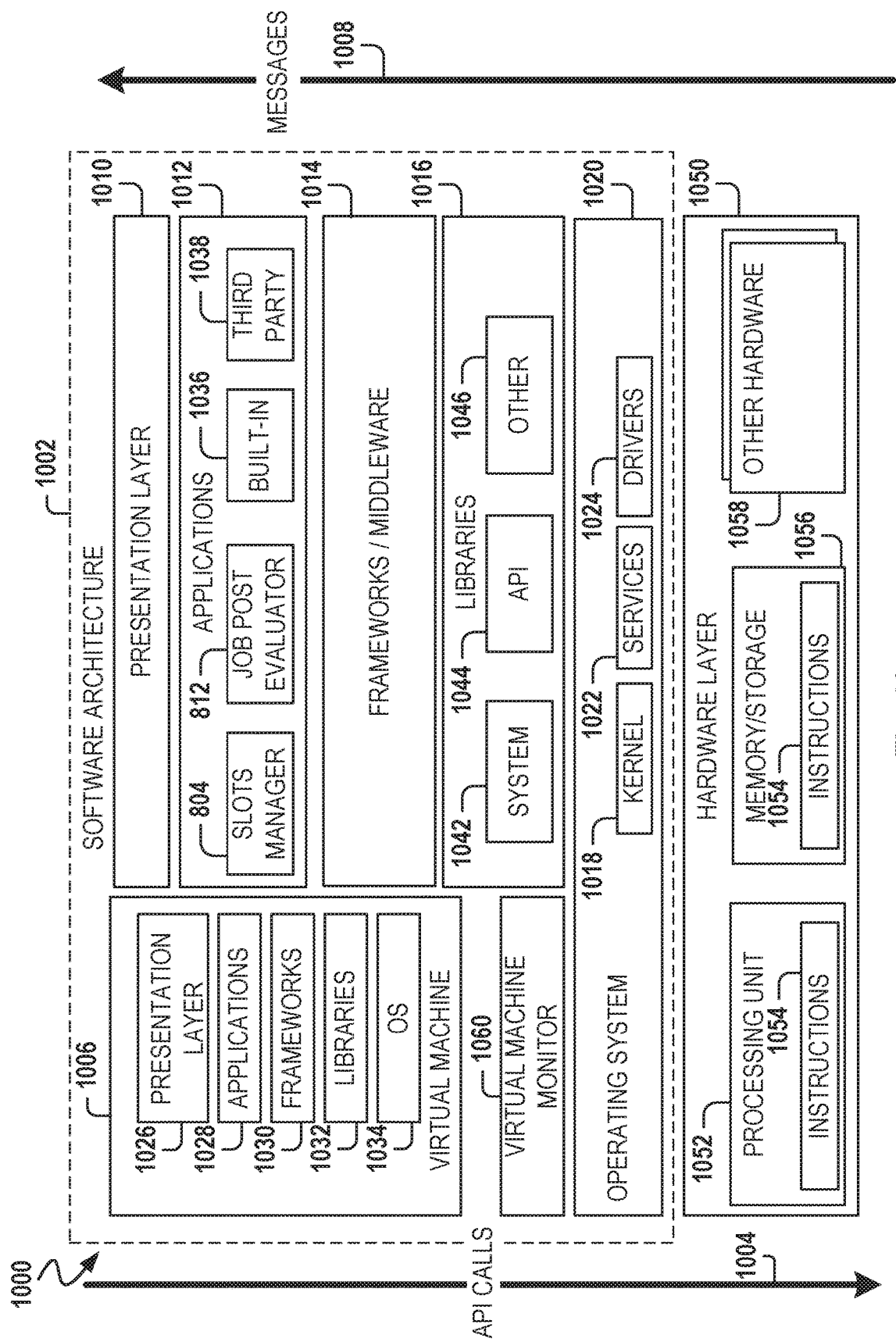
FIG. 10 is a block diagram illustrating a representative software architecture, which may be used in conjunction with various hardware architectures herein described.

FIG. 10 is a block diagram 1000 illustrating a representative software architecture 1002, which may be used in conjunction with various hardware architectures herein described. FIG. 10 is merely a non-limiting example of a software architecture 1002, and it will be appreciated that many other architectures may be implemented to facilitate the functionality described herein. The software architecture 1002 may be executing on hardware such as a machine 1100 of FIG. 11 that includes, among other things, processors 1104, memory/storage 1106, and input/output (I/O) components 1118. A representative hardware layer 1050 is illustrated and may represent, for example, the machine 1100 of FIG. 11. The representative hardware layer 1050 comprises one or more processing units 1052 having associated executable instructions 1054. The executable instructions 1054 represent the executable instructions of the software architecture 1002, including implementation of the methods, modules, and so forth of FIGS. 1-9. The hardware layer 1050 also includes memory and/or storage modules 1056, which also have the executable instructions 1054. The hardware layer 1050 may also comprise other hardware 1058, which represents any other hardware of the hardware layer 1050, such as the other hardware illustrated as part of the machine 1100.

In the example architecture of FIG. 10, the software architecture 1002 may be conceptualized as a stack of layers where each layer provides particular functionality. For example, the software architecture 1002 may include layers such as an operating system 1020, libraries 1016, frameworks/middleware 1014, applications 1012, and a presentation layer 1010. Operationally, the applications 1012 and/or other components within the layers may invoke API calls 1004 through the software stack and receive a response, returned values, and so forth illustrated as messages 1008 in response to the API calls 1004. The layers illustrated are representative in nature, and not all software architectures have all layers. For example, some mobile or special-purpose operating systems may not provide a frameworks/middleware 1014 layer, while others may provide such a layer. Other software architectures may include additional or different layers.

The operating system 1020 may manage hardware resources and provide common services. The operating system 1020 may include, for example, a kernel 1018, services 1022, and drivers 1024. The kernel 1018 may act as an abstraction layer between the hardware and the other software layers. For example, the kernel 1018 may be responsible for memory management, processor management (e.g., scheduling), component management, networking, security settings, and so on. The services 1022 may provide other common services for the other software layers. The drivers 1024 may be responsible for controlling or interfacing with the underlying hardware. For instance, the drivers 1024 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1012 and/or other components and/or layers. The libraries 1016 typically provide functionality that allows other software modules to perform tasks in an easier fashion than by interfacing directly with the underlying operating system 1020 functionality (e.g., kernel 1018, services 1022, and/or drivers 1024). The libraries 1016 may include system libraries 1042 (e.g., C standard library) that may provide functions such as memory allocation functions, string manipulation functions, mathematic functions, and the like. In addition, the libraries 1016 may include API libraries 1044 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional (2D) and three-dimensional (3D) graphic content on a display), database libraries (e.g., SQLite that may provide various relational database functions), web libraries (e.g., WebKit that may provide web browsing functionality), and the like. The libraries 1016 may also include a wide variety of other libraries 1046 to provide many other APIs to the applications 1012 and other software components/modules.

The frameworks 1014 (also sometimes referred to as middleware) may provide a higher-level common infrastructure that may be utilized by the applications 1012 and/or other software components/modules. For example, the frameworks 1014 may provide various graphic user interface (GUI) functions, high-level resource management, high-level location services, and so forth. The frameworks 1014 may provide a broad spectrum of other APIs that may be utilized by the applications 1012 and/or other software components/modules, some of which may be specific to a particular operating system or platform.

The applications 1012 include the slots manager 804, the job post evaluator 812, other modules as shown in FIG. 8, built-in applications 1036, and third-party applications 1038. Examples of representative built-in applications 1036 may include, but are not limited to, a contacts application, a browser application, a book reader application, a location application, a media application, a messaging application, and/or a game application. The third-party applications 1038 may include any of the built-in applications 1036 as well as a broad assortment of other applications. In a specific example, the third-party application 1038 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1038 may invoke the API calls 1004 provided by the mobile operating system such as the operating system 1020 to facilitate functionality described herein.

The applications 1012 may utilize built-in operating system functions (e.g., kernel 1018, services 1022, and/or drivers 1024), libraries (e.g., system libraries 1042, API libraries 1044, and other libraries 1046), or frameworks/middleware 1014 to create user interfaces to interact with users of the system. Alternatively, or additionally, in some systems, interactions with a user may occur through a presentation layer, such as the presentation layer 1010. In these systems, the application/module "logic" may be separated from the aspects of the application/module that interact with a user.

Some software architectures utilize virtual machines. In the example of FIG. 10, this is illustrated by a virtual machine 1006. A virtual machine creates a software environment where applications/modules may execute as if they were executing on a hardware machine (such as the machine 1100 of FIG. 11, for example). The virtual machine 1006 is hosted by a host operating system (e.g., the operating system 1020) and typically, although not always, has a virtual machine monitor 1060, which manages the operation of the virtual machine 1006 as well as the interface with the host operating system (e.g., the operating system 1020). A software architecture executes within the virtual machine 1006 such as an operating system 1034, libraries 1032, frameworks/middleware 1030, applications 1028, and/or a presentation layer 1026. These layers of software architecture executing within the virtual machine 1006 may be the same as corresponding layers previously described or may be different.

Figure 11:
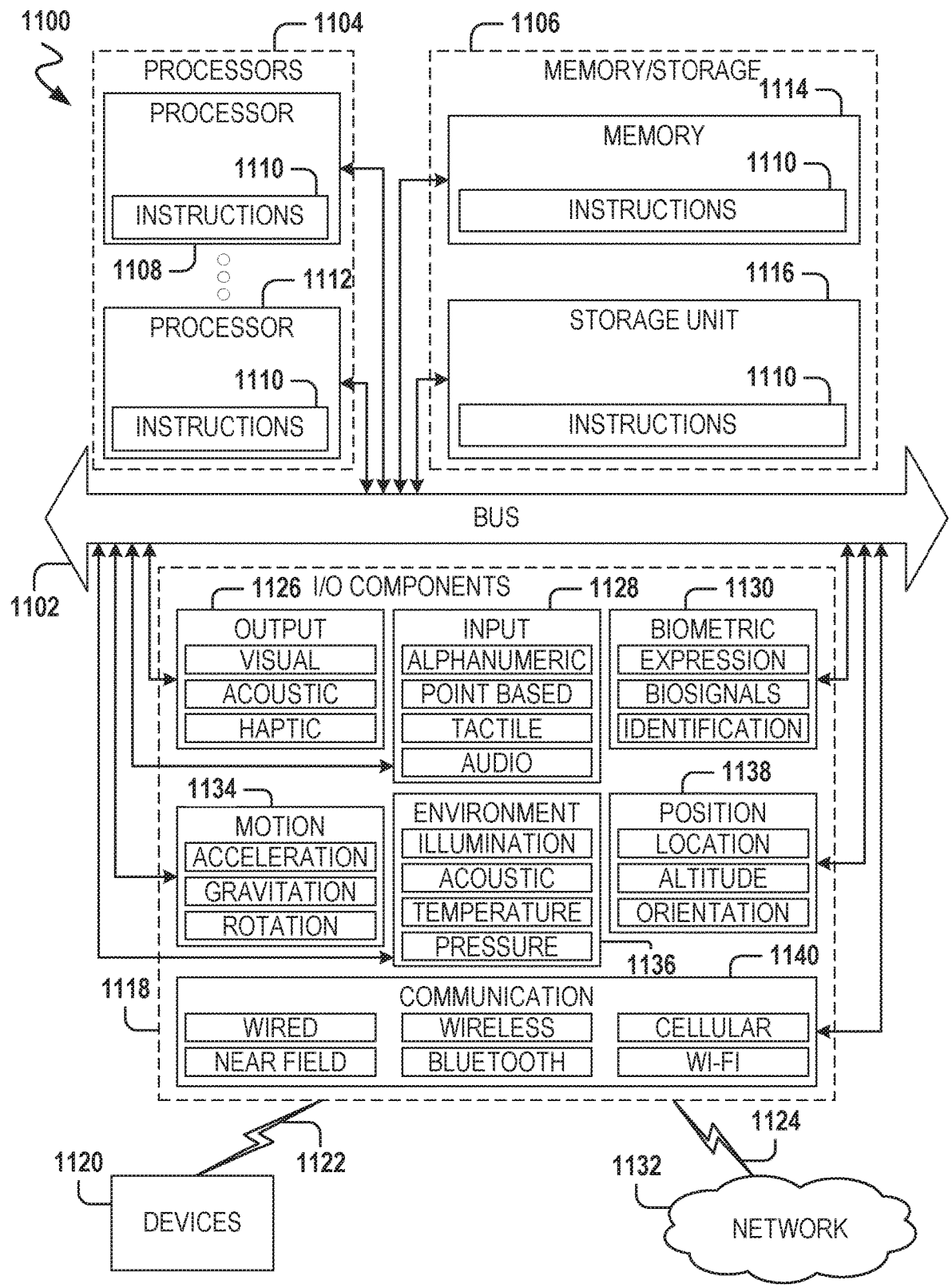
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute the flow diagrams of FIGS. 3, 6, 7, and 9. Additionally, or alternatively, the instructions 1110 may implement the programs illustrated in FIG. 8, and so forth. The instructions 1110 transform the general, non-programmed machine 1100 into a particular machine 1100 programmed to carry out the described and illustrated functions in the manner described.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a switch, a controller, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines 1100 that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. In an example embodiment, the processors 1104 (e.g., a CPU, a Reduced Instruction Set Computing (RISC) processor, a Complex Instruction Set Computing (CISC) processor, a GPU, a Digital Signal Processor (DSP), an Application-Specific Integrated Circuit (ASIC), a Radio-Frequency Integrated Circuit (RFIC), another processor, or any suitable combination thereof) may include, for example, a processor 1108 and a processor 1112 that may execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single core, a single processor with multiple cores (e.g., a multi-core processor), multiple processors with a single core, multiple processors with multiple cores, or any combination thereof.

The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of the processors 1104 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store the instructions 1110. The term "machine-readable medium" shall also be taken to include any medium, or combination of multiple media, that is capable of storing instructions (e.g., instructions 1110) for execution by a machine (e.g., machine 1100), such that the instructions, when executed by one or more processors of the machine (e.g., processors 1104), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1118 may include a wide variety of components to receive input, provide output, produce output, transmit information, exchange information, capture measurements, and so on. The specific I/O components 1118 that are included in a particular machine will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion, and the grouping is in no way limiting. In various example embodiments, the I/O components 1118 may include output components 1126 and input components 1128. The output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122, respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

In various example embodiments, one or more portions of the network 1132 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1132 or a portion of the network 1132 may include a wireless or cellular network and the coupling 1124 may be a Code Division Multiple Access (CDMA) connection, a Global System for Mobile communications (GSM) connection, or another type of cellular or wireless coupling. In this example, the coupling 1124 may implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 7G, fourth generation wireless (4G) networks, Universal Mobile Telecommunications System (UMTS), High-Speed Packet Access (HSPA). Worldwide Interoperability for Microwave Access (WiMAX), Long-Term Evolution (LTE) standard, others defined by various standard-setting organizations, other long-range protocols, or other data transfer technology.

The instructions 1110 may be transmitted or received over the network 1132 using a transmission medium via a network interface device (e.g., a network interface component included in the communication components 1140) and utilizing any one of a number of well-known transfer protocols (e.g., hypertext transfer protocol (HTTP)). Similarly, the instructions 1110 may be transmitted or received using a transmission medium via the coupling 1122 (e.g., a peer-to-peer coupling) to the devices 1120. The term "transmission medium" shall be taken to include any intangible medium that is capable of storing, encoding, or carrying the instructions 1110 for execution by the machine 1100, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
calculating, by a machine learning model, scores for job posts of a company, the machine learning model being trained with training data associated with performance of previously posted job posts, the training data having features including company posting the previously posted job posts, job post title, and job post description;
selecting, based on the scores, a plurality from the job posts of the company to create a job pool of job posts of the company available for presentation to members of a social networking service;
selecting, by one or more processors, a job post from the job pool for inclusion in one of a plurality of job slots of the company that are presented to members of the social networking service;
presenting, by the one or more processors, the selected job post to one or more members of the social networking service;
determining, by the one or more processors, a view threshold number for the selected job post, wherein the view threshold number is determined based on a performance of previously posted successful job posts according to a day of a week that the previously posted successful job posts were posted;
determining, by the one or more processors, a number of views of the selected job post by members of the social networking service within a predetermined time period;
when the number of views is greater than or equal to the view threshold number, keeping, by the one or more processors, the selected job post in the job slot of the company; and
when the number of views is less than the view threshold number, replacing the selected job post in the job slot of the company with an additional job post from the job pool of the company.

2. The method as recited in claim 1, wherein replacing the selected job post in the job slot further comprises:
marking the job post as a rotatable job post, wherein rotatable job posts are discarded from the job slot when other job posts of the company are available in the job pool.

3. The method as recited in claim 1, wherein determining the view threshold number for the selected job post further comprises:
accessing a performance of job posts previously posted in the social networking service; and
determining which of the job posts previously posted are successful job posts based on of a number of views, a number of applications, and if the job post previously posted resulted in a confirmed hire.

4. The method as recited in claim 1, wherein the predetermined time period is a calendar day that follows a day when the selected job post was initially presented.

5. The method as recited in claim 1, wherein the predetermined time period is three calendar days that follow a day when the selected job post was initially presented.

6. The method as recited in claim 1, wherein selecting the job post further comprises:
selecting the job post from the job pool of job posts of the company having a most recent creation time.

7. The method as recited in claim 1, wherein selecting the job post further comprises:

selecting the job post based on a diversity of job posts in the job pool, wherein the job post is selected to increase the diversity of the job posts in the job pool.

8. The method as recited in claim 1, further comprising:
importing job posts posted on a website of the company; and
adding the imported job posts to the job pool based on the scores of the imported job posts.

9. The method as recited in claim 1, wherein a job post that is pinned to one of the job slots in the job pool of job posts of the company stays permanently in the job slot until the job post is unpinned.

10. The method as recited in claim 1, further comprising:
discarding the selected job post after the selected job post has been presented to the members of the social networking service for a predetermined number of days, the predetermined number of days being based on a probability that the selected job post results in a confirmed hire.

11. A system comprising:
a memory comprising instructions; and
one or more computer processors, wherein the instructions, when executed by the one or more computer processors, cause the one or more computer processors to perform operations comprising:
calculating, by a machine learning model, scores for job posts of a company, the machine learning model being trained with training data associated with performance of previously posted job posts, the training data having features including company posting the previously posted job posts, job post title, and job post description;
selecting, based on the scores, a plurality from the job posts of the company to create a job pool of job posts of the company available for presentation to members of a social networking service;
selecting a job post from the job pool for inclusion in one of a plurality of job slots of the company that are presented to members of the social networking service;
presenting the selected job post to one or more members of the social networking service;
determining a view threshold number for the selected job post, wherein the view threshold number is determined based on a performance of previously posted successful job posts according to a day of a week that the previously posted successful job posts were posted;
determining a number of views of the job post by members of the social networking service within a predetermined time period;
when the number of views is greater than or equal to the view threshold number, keeping the job post in the job slot of the company; and
when the number of views is less than the view threshold number, marking the job post as a rotatable job post, wherein rotatable job posts are discarded from the plurality of job slots when other jobs are available in the job pool of job posts of the company.

12. The system as recited in claim 11, wherein determining the view threshold number for the selected job post further comprises:
accessing a performance of job posts previously posted in the social networking service; and
determining which of the job posts previously posted are successful job posts based on of a number of views, a number of applications, and if the job post previously posted resulted in a confirmed hire.

13. The system as recited in claim 11, wherein the predetermined time period is a calendar day that follows a day when the selected job post was initially presented.

14. The system as recited in claim 11, wherein the predetermined time period is three calendar days that follow a day when the selected job post was initially presented.

15. The system as recited in claim 11, wherein selecting the job post further comprises:
selecting the job post from the job pool of job posts of the company having a most recent creation time.

16. A non-transitory machine-readable storage medium including instructions that, when executed by a machine, cause the machine to perform operations comprising:
calculating, by a machine learning model, scores for job posts of a company, the machine learning model being trained with training data associated with performance of previously posted job posts, the training data having features including company posting the previously posted job posts, job post title, and job post description;
selecting, based on the scores, a plurality from the job posts of the company to create a job pool of job posts of the company available for presentation to members of a social networking service;
selecting a job post from the job pool for inclusion in one of a plurality of job slots of the company that are presented to members of the social networking service;
presenting the selected job post to one or more members of the social networking service;
determining a view threshold number for the selected job post, wherein the view threshold number is determined based on a performance of previously posted successful job posts according to a day of a week that the previously posted successful job posts were posted;
determining a number of views of the job post by members of the social networking service within a predetermined time period;
when the number of views is greater than or equal to the view threshold number, keeping the job post in the job slot of the company; and
when the number of views is less than the view threshold number, marking the job post as a rotatable job post, wherein rotatable job posts are discarded from the plurality of job slots when other jobs are available in the job pool of job posts of the company.

17. The machine-readable storage medium as recited in claim 16, wherein determining the view threshold number for the selected job post further comprises:
accessing a performance of job posts previously posted in the social networking service; and
determining which of the job posts previously posted are successful job posts based on of a number of views, a number of applications, and if the job post previously posted resulted in a confirmed hire.

18. The machine-readable storage medium as recited in claim 16, wherein the predetermined time period is a calendar day that follows a day when the selected job post was initially presented.

19. The machine-readable storage medium as recited in claim 16, wherein the predetermined time period is three calendar days that follow a day when the selected job post was initially presented.

* * * * *